(12) United States Patent
Inoue et al.

(10) Patent No.: US 11,127,951 B2
(45) Date of Patent: Sep. 21, 2021

(54) ALKALINE SECONDARY BATTERY

(71) Applicant: Maxell Holdings, Ltd., Kyoto (JP)

(72) Inventors: Yusuke Inoue, Kyoto (JP); Mitsutoshi Watanabe, Kyoto (JP)

(73) Assignee: Maxell Holdings, Ltd., Kyoto (JP)

(*) Notice: Subject to any disclaimer, the term of this patent is extended or adjusted under 35 U.S.C. 154(b) by 145 days.

(21) Appl. No.: 16/482,859

(22) PCT Filed: Mar. 12, 2018

(86) PCT No.: PCT/JP2018/009540
§ 371 (c)(1),
(2) Date: Aug. 1, 2019

(87) PCT Pub. No.: WO2018/173837
PCT Pub. Date: Sep. 27, 2018

(65) Prior Publication Data
US 2019/0355990 A1   Nov. 21, 2019

(30) Foreign Application Priority Data

Mar. 22, 2017  (JP) .............................. JP2017-056466

(51) Int. Cl.
*H01M 4/54* (2006.01)
*H01M 10/32* (2006.01)
*H01M 4/02* (2006.01)

(52) U.S. Cl.
CPC ............. *H01M 4/54* (2013.01); *H01M 10/32* (2013.01); *H01M 2004/028* (2013.01)

(58) Field of Classification Search
CPC ............ H01M 4/54; H01M 4/36; H01M 4/14; H01M 10/32
See application file for complete search history.

(56) References Cited

U.S. PATENT DOCUMENTS 3,154,435 A * 10/1964 Kitagawa ................ H01M 4/36
429/207
5,389,469 A  2/1995 Passaniti et al.
(Continued)

FOREIGN PATENT DOCUMENTS

| JP | 52-142241 | 11/1977 |
| JP | 2001-202958 A | 7/2001 |

(Continued)

OTHER PUBLICATIONS

International Search Report issued in PCT/JP2018/009540 (PCT/ISA/210), dated Apr. 24, 2018.
(Continued)

*Primary Examiner* — Kenneth J Douyette
(74) *Attorney, Agent, or Firm* — Birch, Stewart, Kolasch & Birch, LLP

(57) ABSTRACT

An alkaline secondary battery disclosed in the present application includes a positive electrode containing a positive electrode active material, a negative electrode, and a separator. The positive electrode active material contains a mixture of a silver oxide and a silver-bismuth complex oxide. A discharge curve is obtained when the battery that is fully charged is discharged with a constant current until a battery voltage drops to 1.0 V. The battery voltage at a point on the discharge curve where x (%) of a total discharge capacity has been discharged from the battery since start of discharge is represented by $V_x$ (V). The discharge curve satisfies $V_{10}-V_{70} \leq 0.08$, has a step in the range of $70 \leq x \leq 90$, and shows that a size of the step represented by $V_{70}-V_{90}$ is 0.04 or more and 0.15 or less.

6 Claims, 3 Drawing Sheets

(56) References Cited

U.S. PATENT DOCUMENTS

| | | | |
|---|---|---|---|
| 6,001,508 A | 12/1999 | Passaniti et al. | |
| 2003/0082450 A1 | 5/2003 | Tanoue et al. | |
| 2005/0058903 A1* | 3/2005 | Eylem | H01M 50/449 |
| | | | 429/220 |
| 2005/0164089 A1* | 7/2005 | Iltchev | H01M 4/42 |
| | | | 429/232 |
| 2006/0141360 A1 | 6/2006 | Tanoue | |
| 2008/0008937 A1 | 1/2008 | Eylem et al. | |
| 2014/0302347 A1* | 10/2014 | Specht | H01M 50/103 |
| | | | 429/7 |

FOREIGN PATENT DOCUMENTS

| | | |
|---|---|---|
| JP | 2002-260653 A | 9/2002 |
| JP | 2006-185649 A | 7/2006 |
| JP | 2009-543313 A | 12/2009 |
| WO | WO 02/23647 A1 | 3/2002 |

OTHER PUBLICATIONS

Pan et al., "Analysis of electrochemical mechanism of coprecipitated nano-$Ag_4Bi_2O_5$ as super high charge-discharge rate cathode materials for aqueous rechargeable battery", Electrochimica Acta, vol. 59 (2012), pp. 515-521.

Extended European Search Report, dated Jan. 2, 2020, for European Application No. 18770292.3.

European Communication pursuant to Article 94(3) EPC for European Application No. 18770292.3, dated Dec. 17, 2020.

\* cited by examiner

ALKALINE SECONDARY BATTERY

TECHNICAL FIELD

The present invention relates to an alkaline secondary battery that has excellent voltage flatness and is easy to detect the end-of-discharge time.

BACKGROUND ART

An alkaline battery (silver oxide battery) includes a positive electrode containing a silver oxide, a negative electrode containing zinc or a zinc alloy, and an alkaline electrolyte solution. This alkaline battery has been widely and generally used as a primary battery. Moreover, the silver oxide battery is highly useful as a power source for precision instruments such as watches because the discharge potential of the silver oxide (positive electrode active material) is constant and the discharge curve of the battery is very flat.

However, due to a small change in voltage during discharge, it is difficult to detect the residual capacity until the end of discharge of the battery. Further, there is only a short period of time between when the discharge voltage starts to fall rapidly and when the discharge is completed. This makes it difficult to know the replacement time of the battery in good time before the operation of the apparatus is stopped.

To deal with these issues, a battery has been proposed that includes a positive electrode formed by adding a bismuth oxide to a silver oxide, which causes a step change in the discharge voltage at the end of discharge of the battery, so that the battery life can be detected (see Patent Document 1). Moreover, the use of a complex oxide containing Ag and Bi as a positive electrode active material of an alkaline primary battery, although not intended to detect the end of discharge of the battery, has also been proposed, and another battery having a discharge curve with a step has been provided (see Patent Documents 2 and 3). Using these technologies, it is possible to detect in advance the end of discharge of the primary battery that contains a silver oxide or a silver-containing compound as a positive electrode active material.

On the other hand, as described in Patent Document 4, the use of a silver oxide as a positive electrode active material of an alkaline secondary battery has previously been studied, and some alkaline secondary batteries are already commercially available for various applications such as hearing aids.

PRIOR ART DOCUMENTS

Patent Documents

Patent Document 1: JP S52(1977)-142241
Patent Document 2: JP 2002-260653 A
Patent Document 3: JP 2009-543313 A
Patent Document 4: JP 2001-202958 A

DISCLOSURE OF INVENTION

Problem to be Solved by the Invention

Similarly to the primary battery, it is also difficult to detect the end of discharge of the alkaline secondary battery that contains a silver oxide as a positive electrode active material. Even if the configuration of Patent Document 1 or Patent Document 2 is applied to the secondary battery, the secondary battery may have problems of, e.g., charge and discharge reversibility of the positive electrode and flatness of the discharge voltage. Thus, the secondary battery with satisfactory properties cannot be obtained.

With the foregoing in mind, the present invention provides an alkaline secondary battery that has excellent voltage flatness and is easy to detect the end-of-discharge time.

Means for Solving Problem

An alkaline secondary battery of the present invention includes a positive electrode containing a positive electrode active material, a negative electrode, and a separator. The positive electrode active material contains a mixture of a silver oxide and a silver-bismuth complex oxide. A discharge curve is obtained when the battery that is fully charged is discharged with a constant current until a battery voltage drops to 1.0 V. The battery voltage at a point on the discharge curve where x (%) of a total discharge capacity has been discharged from the battery since start of discharge is represented by $V_x$ (V). The discharge curve satisfies $V_{10}-V_{70} \leq 0.08$, has a step in the range of $70 \leq x \leq 90$, and shows that a size of the step represented by $V_{70}-V_{90}$ is 0.04 or more and 0.15 or less.

To obtain the discharge curve, the charge and discharge of the battery may be performed under the following conditions. For charging, the battery is subjected to a constant-current and constant-voltage charge, which is the combination of a constant current charge and a constant voltage charge. First, the battery that has been discharged to 1.0 V is charged with a current value C (mA) at which it takes about 4 hours for the battery voltage to reach 1.85 V from the start of the charge. Then, the battery is charged with a voltage of 1.85 V. The charge of the battery is terminated when the current value is reduced to C/10 (mA). In order to determine the current value C (mA), the time required for the battery voltage to reach 1.85 V from the start of the charge may be slightly longer or shorter than 4 hours. Thus, the current value may be determined so that the above time is in the range of 4±0.25 hours. For discharging, the battery is subjected to a constant current discharge. The battery is discharged with a current of C/2 (mA). The discharge of the battery is terminated when the battery voltage is reduced to 1.0 V. The discharge capacity of the battery obtained under these discharge conditions is defined as the "total discharge capacity".

In the present invention, the phrase "the discharge curve has a step" means that there is an inflection point in the range of 70<x<90 of the discharge curve on which x (%) as the depth of discharge is represented by the horizontal axis and the battery voltage $V_x$ (V) is represented by the vertical axis.

In general, the alkaline secondary battery of the present invention needs to go through several charge-discharge cycles until the shape of the discharge curve is substantially constant after the production of the battery. Therefore, it is desirable that the charge and discharge of the battery to obtain the discharge curve be performed after the battery has been repeatedly charged and discharged for about 10 cycles.

Effects of the Invention

The present invention can provide an alkaline secondary battery that has excellent voltage flatness and is easy to detect the end-of-discharge time.

DESCRIPTION OF THE INVENTION

Figure 1:
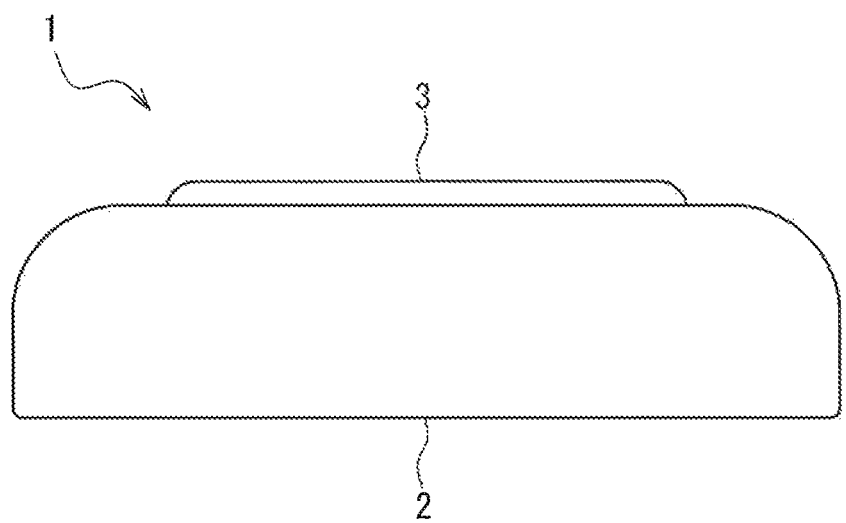
FIG. 1 is a side view schematically illustrating an example of an alkaline secondary battery of the present invention.

In the alkaline secondary battery of the present invention, the silver oxide of the positive electrode active material may be an oxide of silver used as a positive electrode active material of a silver oxide primary battery such as AgO or $Ag_2O$. The silver oxide is preferably $Ag_2O$ in terms of the voltage flatness during discharge.

In the alkaline secondary battery of the present invention, the silver-bismuth complex oxide of the positive electrode active material may be, e.g., a complex oxide based on a silver oxide such as $Ag_2O$ or AgO and a bismuth oxide such as $Bi_2O_3$, $Bi_2O_4$, or $Bi_2O_5$. The silver-bismuth complex oxide is preferably expressed by, e.g., $(Ag_2O)_{1-t}(B_2O_3)_t$ or $(Ag_2O)_{1-z}(Bi_2O_5)_z$, and may be a solid solution of the silver oxide and the bismuth oxide.

Specific examples of the silver-bismuth complex oxide include the following: $Ag_5BiO_4$, $Ag_3BiO_3$, and $Ag_4Bi_2O_5$ as compounds in which the average valence of Bi is 3; $Ag_{25}Bi_3O_{18}$ and $Ag_2BiO_3$ as compounds in which the average valence of Bi is about 4; and $AgBiO_3$ and $Ag_7BiO_6$ as compounds in which the average valence of Bi is 5. Among them, the compounds in which the average valence of Bi is 3 are preferred, e.g., in terms of charge and discharge reversibility.

The silver-bismuth complex oxide can be synthesized by, e.g., the following method. A sufficient amount of alkaline aqueous solution (e.g., KOH aqueous solution or NaOH aqueous solution) with a concentration of about 40 to 50% by mass is prepared and maintained at a temperature of about 90 to 100° C. While the alkaline aqueous solution is being stirred, an aqueous solution in which water-soluble salts of Ag and Bi (such as $AgNO_3$, $Ag_2(SO_4)$, AgCl, $Bi(NO_3)_3$, $Bi_2(SO_4)_3$, and $BiCl_3$) are dissolved at a predetermined ratio is added, so that the neutralized product is precipitated. The precipitate thus produced is washed with water and dried, resulting in a compound in which the average valence of Bi is 3. Moreover, when an aqueous solution of an oxidizing agent such as $K_2S_2O_8$ is further added at the same time as adding the aqueous solution containing the water-soluble salts of Ag and Bi or after precipitating the neutralized product, and the resulting mixture continues to be stirred for about 30 minutes to 1 hour, a compound with a higher oxidation number, e.g., a compound in which the average valence of Bi is 4 to 5 can be obtained. Alternatively, $Ag_2O$ and $Bi_2O_3$ may be combined by a mechanochemical reaction.

The silver oxide and the silver-bismuth complex oxide may contain an element other than bismuth.

The positive electrode active material of the alkaline secondary battery of the present invention contains a mixture of the silver oxide and the silver-bismuth complex oxide. The mixture may be obtained by simply mixing particles of the silver oxide and particles of the silver-bismuth complex oxide. Alternatively, the mixture may be a composite in which each particle contains both phases of the silver oxide and the silver-bismuth complex oxide. When the synthesis process of the silver-bismuth complex oxide provides a product that contains a mixture of the silver-bismuth complex oxide and the silver oxide, this product may be used as the positive electrode active material.

The position where the step appears on the discharge curve changes depending on the ratio of the silver-bismuth complex oxide to the mixture of the silver oxide and the silver-bismuth complex oxide. In general, as the ratio of the silver-bismuth complex oxide increases, the step of the discharge curve occurs at the position where the discharge rate is smaller, i.e., where the depth of discharge is lower. Therefore, the flatness of the discharge curve is reduced. Consequently, since the end-of-discharge time is detected while a large amount of capacity is left in the battery, the detection is meaningless, and the utility of the battery can be a problem. Moreover, as the ratio of the silver-bismuth complex oxide increases, the actual capacity of the positive electrode active material and the storage characteristics of the battery at high temperatures are likely to be reduced. Thus, it is preferable that the ratio of the silver-bismuth complex oxide to the mixture is set to a predetermined value or less so that the flatness of the discharge curve can be improved and the end-of-discharge time can be detected after the battery is discharged to a certain level or higher. For example, the ratio of the total amount of bismuth to the total amount of silver contained in the mixture is preferably less than 9% by mass, and more preferably less than 7% by mass.

On the other hand, if the ratio of the silver-bismuth complex oxide to the mixture of the silver oxide and the silver-bismuth complex oxide is too small, the step of the discharge curve will not easily occur, which may reduce the time it takes from the detection of the end-of-discharge time based on the step of the discharge curve to the stop of the apparatus after completion of the discharge. Therefore, the user may miss the opportunity to recognize that the apparatus needs to be recharged, and it is highly probable that the operation of the apparatus will be stopped without the user knowing it. Thus, it is desirable that the ratio of the silver-bismuth complex oxide to the mixture be set to a predetermined value or more so that there is some time between the detection of the end-of-discharge time and the completion of the discharge. For example, the ratio of the total amount of bismuth to the total amount of silver contained in the mixture is preferably more than 2% by mass, and more preferably more than 3% by mass.

In the present invention, the flatness of the discharge curve is evaluated by the difference $V_{10}-V_{70}$ between the battery voltage $V_{10}$(V) at 10% discharge and the battery voltage $V_{70}$ (V) at 70% discharge. The flatness of the discharge curve is considered good when the difference is 0.08 V or less. The value of $V_{10}-V_{70}$ is preferably 0.05 or less, more preferably 0.04 or less, and particularly preferably 0.035 or less.

In the present invention, the size of the step that appears on the discharge curve is evaluated by the difference $V_{70}-V_{90}$ between the battery voltage $V_{70}$ (V) at 70% discharge and the battery voltage $V_{90}$ (V) at 90% discharge. When the depth of discharge corresponding to the inflection point of the discharge curve is xi (%), it is more appropriate that the size of the step is evaluated by, e.g., the difference $V_{xi-5}-V_{xi+5}$ between the battery voltage $V_{xi-5}$ (V) at a depth of discharge of xi−5(%) and the battery voltage $V_{xi+5}$ (V) at a depth of discharge of xi+5(%). However, the present invention simply uses the above voltage difference to evaluate the size of the step that appears on the discharge curve.

If the step of the discharge curve is too small, it is difficult to detect a change in the discharge voltage. Therefore, the value of $V_{70}-V_{90}$ is preferably 0.04 or more, and more preferably 0.07 or more. On the other hand, if the step of the discharge curve is too large, the voltage at the second stage of the discharge curve becomes excessively low, and the discharge capacity remaining after the step occurs is not likely to be used for the operation of the apparatus. Thus, the value of $V_{70}-V_{90}$ is preferably 0.15 or less, and more preferably 0.1 or less. In the present invention, the value of $V_{70}-V_{90}$ can be changed by, e.g., the composition of the silver-bismuth complex oxide.

The particle sizes of the silver oxide and the silver-bismuth complex oxide are not particularly limited. It is preferable that both the silver oxide and the silver-bismuth complex oxide have a small average particle size in terms of the charge-discharge cycle characteristics. Specifically, the average particle size of the silver oxide and the silver-bismuth complex oxide is preferably 15 µm or less, more preferably 10 µm or less, particularly preferably 5 µm or less, and most preferably 3 µm or less.

The use of the positive electrode active material with the above particle size improves the utilization rate during charge, and thus makes it easy to obtain a large charge capacity even if an end-of-charge voltage is relatively low. Therefore, the charge-discharge cycle characteristics of the battery can be improved further. Moreover, it is possible to reduce a swell of the battery that can be caused by, e.g., increasing the end-of-charge voltage.

However, if the particle size of the positive electrode active material is too small, the production and subsequent handling of the positive electrode active material become difficult. Therefore, the average particle size of the silver oxide and the silver-bismuth complex oxide is preferably 0.1 µm or more, and more preferably 0.5 µm or more.

In the present specification, the average particle size of the positive electrode active material means a particle diameter (D50) at a cumulative frequency of 50% in the volume-based distribution, which is measured with a laser scattering particle size distribution analyzer (e.g., "LA-920" manufactured by HORIBA, Ltd.) by dispersing the particles in a medium that does not dissolve those particles.

The positive electrode active material is mixed with, e.g., a conductive assistant, a binder, and an alkaline electrolyte solution, which can be added as needed, to form a positive electrode mixture containing the positive electrode active material. The positive electrode mixture may be molded directly into a positive electrode as a molded body. Alternatively, the positive electrode mixture may be dispersed in a dispersion medium such as water or an organic solvent to prepare a coating material. The coating material may be applied in layers to one side or both sides of a current collector, thereby forming a sheet-type positive electrode with a positive electrode mixture layer provided on the current collector. Then, the sheet-type positive electrode may be used for the production of the battery.

The conductive assistant of the positive electrode is preferably, e.g., a carbonaceous material such as carbon black or graphite.

The content of the silver oxide in the positive electrode mixture (i.e., the positive electrode mixture molded body or the positive electrode mixture layer) is preferably, e.g., 60% by mass or more, and more preferably 80% by mass or more, and particularly preferably 90% by mass or more in order to ensure the capacity. The content of the conductive assistant in the positive electrode mixture is preferably 0.2% by mass or more, more preferably 0.5% by mass or more, and particularly preferably 1% by mass or more in terms of the conductivity. On the other hand, the content of the conductive assistant in the positive electrode mixture is preferably 7% by mass or less, more preferably 5% by mass or less, and particularly preferably 3% by mass or less in order to prevent a reduction in capacity and the generation of gas during charge.

When the positive electrode includes the positive electrode mixture molded body, the thickness of the positive electrode mixture molded body is preferably 0.15 to 4 mm. On the other hand, when the positive electrode is in the form of a sheet, the thickness of the positive electrode mixture layer formed on the current collector (i.e., the thickness per one side of the current collector) is preferably 30 to 300 µm.

The current collector used for the positive electrode may be made of, e.g., stainless steels such as SUS316, SUS430, and SUS444, aluminum, or aluminum alloy. The current collector may be in the form of, e.g., a plain-woven wire mesh, an expanded metal, a lath mesh, a punching metal, a metal foam, or a foil (plate). The thickness of the current collector is preferably, e.g., 0.05 to 0.2 mm. It is also desirable that a paste-like conductive material such as carbon paste or silver paste be applied to the surface of the current collector.

The negative electrode of the alkaline secondary battery of the present invention preferably contains zinc particles or zinc alloy particles (which may be collectively called "zinc-based particles" in the following). The zinc present in the particles acts as an active material of the negative electrode.

Examples of alloying elements added to the zinc alloy particles include indium, bismuth, aluminum, magnesium, and calcium. Depending on the elemental species and content of the alloying elements, the added elements do not form a uniform solid solution with a parent phase of zinc and may lead to local segregation in the particles.

The content of the alloying elements is not necessarily limited. For example, the content of the alloying elements is preferably 0.005 to 0.05% by mass (50 to 500 ppm) for indium, 0.005 to 0.05% by mass (50 to 500 ppm) for bismuth, 0.0005 to 0.02% by mass (5 to 200 ppm) for aluminum, and 0.0001 to 0.002% by mass (1 to 20 ppm) for magnesium. The negative electrode may contain either one type or two or more types of zinc-based particles.

It is preferable that the zinc-based particles include a mercury-free alloy component. The use of such zinc-based particles in the battery can reduce the environmental pollution caused by battery disposal. It is also preferable that the zinc-based particles include a lead-free alloy component for the same reason as mercury.

The particle size of the zinc-based particles may be defined as follows. For example, the proportion of the particles with a particle diameter of 75 µm or less is preferably 50% by mass or less, and more preferably 30% by mass or less of the whole powder. Moreover, the proportion of the particles with a particle diameter of 100 to 200 µm is preferably 50% by mass or more, and more preferably 90% by mass or more of the whole powder.

Similarly to the average particle size of the positive electrode active material, the particle size of the zinc-based particles can be determined from the volume-based cumulative frequency that is measured with a laser scattering particle size distribution analyzer.

In the alkaline secondary battery including the above negative electrode active material, the repetition of charge and discharge may pose the following problems: (i) the shape of the negative electrode is gradually deformed to prevent a sufficient electrical contact with a negative electrode can (a sealing plate or an outer can); and (ii) zinc dendrite grows in the negative electrode and enters the separator, resulting in a short circuit. Therefore, it is desirable that the alkaline secondary battery be configured to suppress a reduction in battery capacity due to charge and discharge cycles.

In view of the above, the alkaline secondary battery of the present invention preferably includes a particular anion conductive membrane that is interposed between the positive electrode and the negative electrode. This configuration can maintain the form of the negative electrode and also suppress the generation or growth of zinc dendrite in the negative electrode, even if the battery is repeatedly charged and discharged. Thus, the alkaline secondary battery can have excellent charge-discharge cycle characteristics.

The anion conductive membrane preferably includes, e.g., a polymer as a matrix and particles of a metal compound dispersed in the matrix.

The polymer used as a matrix of the anion conductive membrane is not particularly limited. Examples of the polymer include the following: fluorocarbon resins such as polyvinylidene fluoride (PVDF), polytetrafluoroethylene (PTFE), a vinylidene fluoride-hexafluoropropylene copolymer (PVDF-HFP), a vinylidene fluoride-chlorotrifluoroethylene copolymer (PVDF-CTFE), a vinylidene fluoride-tetrafluoroethylene copolymer (PVDF-TFE), and a vinylidene fluoride-hexafluoropropylene-tetrafluoroethylene copolymer (PVDF-HFP-TFE); polyolefins such as polyethylene (PE) and polypropylene (PP); polystyrene; and polymers having a polar group or a polar bond in molecules (referred to as "polar polymers" in the following).

Examples of the polar polymers include the following: a polymer containing an amino group such as polyalkyleneimine (polyethyleneimine); a polymer containing an ester bond (ester group) such as (alkoxy)polyalkylene glycol mono(meth)acrylate; polymers containing carboxylate groups (i.e., salts of carboxyl groups) such as an alkali metal salt (e.g., a sodium salt) of poly(meth)acrylic acid, a magnesium salt of poly(meth)acrylic acid, an alkaline earth metal salt (e.g., a calcium salt) of poly(meth)acrylic acid, an ammonium salt of poly(meth)acrylic acid, an alkali metal salt (e.g., a sodium salt) of polymaleic acid, a magnesium salt of polymaleic acid, an alkaline earth metal salt (e.g., a calcium salt) of polymaleic acid, and an ammonium salt of polymaleic acid; and polyamide. In the above examples, the "(meth)acrylic acid" is a term that combines acrylic acid and methacrylic acid.

The anion conductive membrane may include either one type or two or more types of polymers listed above as a matrix. The anion conductive membrane more preferably includes the fluorocarbon resins, and further preferably includes the fluorocarbon resins and the polar polymers.

The particles of the metal compound dispersed in the anion conductive membrane may be particles of at least one compound selected from the group consisting of metal oxides, metal hydroxides, metal carbonates, metal sulfates, metal phosphates, metal borates, and metal silicates.

Examples of metal oxides include a cerium oxide, a zirconium oxide, and hydrotalcite. The hydrotalcite is a compound typified by the following general formula (1).

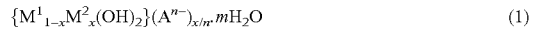
(1)

In the general formula (1), $M_1$ represents, e.g., Mg, Fe, Zn, Ni, Co, Cu, Ca, or Li, $M^2$ represents, e.g., Al, Fe, or Mn, A represents, e.g., $CO_3^{2-}$, m is an integer of 0 or more, n is 2 or 3, and x satisfies $0.2 \leq x \leq 0.4$.

Examples of metal hydroxides include a cerium hydroxide and a zirconium hydroxide. Examples of metal sulfates include ettringite. Examples of metal phosphates include hydroxyapatite.

Among the above metal compounds, an intercalation compound with anion exchange ability such as hydrotalcite is preferred.

The average particle size of the particles of the metal compound is preferably 5 nm or more, more preferably 10 nm or more, and particularly preferably 100 nm or more. The average particle size of the particles of the metal compound is also preferably 100 μm or less, more preferably 10 μm or less, and particularly preferably 1 μm or less.

The average particle size of the particles of the metal compound may be measured in the same manner as the average particle size of the positive electrode active material.

The proportion of the polymer (i.e., the polymer used as a matrix) in the anion conductive membrane is preferably 0.1% by mass or more, more preferably 1% by mass or more, even more preferably 10% by mass or more, and particularly preferably 40% by mass or more. The proportion of the polymer in the anion conductive membrane is also preferably 90% by mass or less, more preferably 80% by mass or less, even more preferably 70% by mass or less, and particularly preferably 60% by mass or less.

The proportion of the particles of the metal compound in the anion conductive membrane is preferably 0.1% by mass or more, more preferably 1% by mass or more, even more preferably 5% by mass or more, and particularly preferably 30% by mass or more. The proportion of the particles of the metal compound in the anion conductive membrane is also preferably 90% by mass or less, more preferably 80% by mass or less, even more preferably 60% by mass or less, and particularly preferably 50% by mass or less.

The thickness of the anion conductive membrane is preferably 10 μm or more, more preferably 20 μm or more, and particularly preferably 40 μm or more in terms of favorably ensuring the effect of the anion conductive membrane. However, if the anion conductive membrane is too thick, the volume occupied by the anion conductive membrane in the battery is increased, which in turn may reduce the amount of a positive electrode active material or a negative electrode active material introduced. Therefore, the thickness of the anion conductive membrane is preferably 500 μm or less, and more preferably 250 μm or less in terms of further increasing the battery capacity.

The anion conductive membrane can be produced in the following manner. For example, a composition for forming the anion conductive membrane is prepared by dispersing the polymer and the particles of the metal compound in water or an organic solvent such as N-methyl-2-pyrrolidone (in this case, the polymer may be dissolved in water or the organic solvent). The composition is applied to the surface of a substrate, dried, and then removed from the substrate. The composition may be pressed after drying. Although the anion conductive membrane does not contain an alkaline electrolyte solution at this stage, the anion conductive membrane is placed in a battery and absorbs the alkaline electrolyte solution that is injected into the battery. Thus, the anion conductive membrane can contain the alkaline electrolyte solution. Alternatively, the anion conductive membrane after drying (or pressing) may be immersed in the alkaline electrolyte solution. Then, the anion conductive membrane that has previously absorbed the alkaline electrolyte solution can be used for the assembly of the battery.

The anion conductive membrane may be used either individually as a separator or in combination with a typical separator that holds the alkaline electrolyte solution. In this case, the anion conductive membrane is provided on the negative electrode and thus can easily perform the above functions.

Examples of the separator other than the anion conductive membrane include the following: a nonwoven fabric mainly composed of vinylon and rayon; a vinylon-rayon nonwoven fabric (vinylon-rayon mixed paper); a polyamide nonwoven fabric; a polyolefin-rayon nonwoven fabric; vinylon paper; vinylon-linter pulp paper; and vinylon-mercerized pulp paper. Moreover, the separator may be a laminate of a hydrophilic microporous polyolefin film (such as a microporous polyethylene film or a microporous polypropylene film), a cellophane film, and a liquid-absorbing layer (i.e., an electrolyte holding layer) such as vinylon-rayon mixed paper. The thickness of the separator is preferably 20 to 500 μm.

The amount of the alkaline electrolyte solution in the separator is not particularly limited. The separator may hold the alkaline electrolyte solution to the extent that it can absorb.

The negative electrode of the alkaline secondary battery of the present invention may be formed of, e.g., a negative electrode agent (gel-like negative electrode) along with the zinc-based particles. The negative electrode agent contains a gelling agent (such as sodium polyacrylate or carboxymethyl cellulose) that may be added as needed, and an alkaline electrolyte solution. The amount of the gelling agent in the negative electrode is preferably, e.g., 0.5 to 1.5% by mass.

The negative electrode can be a non-gel negative electrode that does not substantially contain the above gelling agent. If the alkaline electrolyte solution is thickened by the action of the gelling agent, the gelling agent will interfere with the movement of ions in the electrolyte solution, so that the load characteristics of the battery may be reduced. Therefore, the "non-gel" negative electrode can be effective in improving the ion conductivity of the alkaline electrolyte solution and further enhancing the load characteristics (particularly the heavy-load characteristics) because it does not contain the gelling agent or contains the gelling agent so as not to thicken the alkaline electrolyte solution.

In the negative electrode containing the zinc-based particles, when a charging current is concentrated in some portion of the negative electrode, a zinc precipitation grows in a needle shape, and thus zinc dendrite is produced.

However, if the negative electrode contains polyalkylene glycols, the charging current is not concentrated on one point, but dispersed on the surface of the zinc-based particles. This can suppress the growth of zinc dendrite. Moreover, it is also expected to suppress the generation of gas due to the growth of zinc dendrite, and to improve the storage characteristics. Therefore, the negative electrode of the alkaline secondary battery of the present invention preferably contains polyalkylene glycols.

The polyalkylene glycols may be contained in the negative electrode, e.g., by directly mixing the zinc-based particles and the polyalkylene glycols or by mixing electrolyte (electrolyte solution) containing the polyalkylene glycols with the zinc-based particles.

The polyalkylene glycols used in the alkaline secondary battery are compounds in which alkylene glycols such as ethylene glycol, propylene glycol, and butylene glycol are polymerized or copolymerized. The compounds may have a cross-linked structure, a branched structure, or a structure having the substituted end. The compounds with a weight average molecular weight of about 200 or more are preferably used. The upper limit of the weight average molecular weight is not particularly limited. However, in order to easily achieve the effects of the compounds to be added, the compounds are preferably water-soluble and generally have a weight average molecular weight of 20000 or less, and more preferably 5000 or less.

Specifically, preferred examples include polyethylene glycols in which ethylene glycol is polymerized, and polypropylene glycols in which propylene glycol is polymerized.

The polyethylene glycols preferably include polyethylene glycol, polyethylene oxide, and a straight-chain compound that is expressed by, e.g., the following general formula (2).

[Chemical Formula 1]

$$X\text{-}(CH_2\text{---}CH_2\text{---}O)_n\text{-}Y \qquad (2)$$

In the general formula (2), X represents an alkyl group, a hydroxyl group, a carboxyl group, an amino group, or a halogen atom, Y represents a hydrogen atom or an alkyl group, and n is 4 or more on average.

In the general formula (2), n corresponds to the average addition molar number of ethylene oxide in the polyethylene glycols. Moreover, n is 4 or more on average, and the upper limit of n is not particularly limited. However, the compounds with a weight average molecular weight of about 200 to 20000 are preferably used.

The polypropylene glycols preferably include polypropylene glycol, polypropylene oxide, and a straight-chain compound that is expressed by, e.g., the following general formula (3).

[Chemical Formula 2]

$$Z\text{-}\left[CH_2\text{---}\underset{\underset{CH_3}{|}}{CH}\text{---}O\right]_m\text{-}T \qquad (3)$$

In the general formula (3), Z represents an alkyl group, a hydroxyl group, a carboxyl group, an amino group, or a halogen atom, T represents a hydrogen atom or an alkyl group, and m is 3 or more on average.

In the general formula (3), m corresponds to the average addition molar number of propylene oxide in the polypropylene glycols. Moreover, m is 3 or more on average, and the upper limit of m is not particularly limited. However, the compounds with a weight average molecular weight of about 200 to 20000 are preferably used.

The polyalkylene glycols may be copolymerized compounds including an ethylene oxide unit and a propylene oxide unit (e.g., polyoxyethylene polyoxypropylene glycol).

The content of the polyalkylene glycols in the negative electrode is preferably 0.01 parts by mass or more, and more preferably 0.1 parts by mass or more with respect to 100 parts by mass of the zinc-based particles in terms of favorably improving the charge-discharge cycle characteristics and the storage characteristics of the battery. The content of the polyalkylene glycols in the negative electrode is also preferably 5 parts by mass or less, and more preferably 1 part by mass or less with respect to 100 parts by mass of the zinc-based particles in terms of restricting the amount of the polyalkylene glycols and further improving the discharge characteristics of the battery.

In the alkaline secondary battery of the present invention, the generation or growth of zinc dendrite can also be suppressed by using the negative electrode that contains a calcium compound.

When zinc is dissolved, the calcium compound reacts with zinc to form a precipitate such as $CaZn(OH)_4$ by, e.g., the following reaction: $Ca(OH)_2 + Zn(OH)_4^{2-} + H_2O \rightarrow CaZn(OH)_4 \cdot H_2O + 2OH^-$. Therefore, the calcium compound can prevent the dispersion and movement of zinc ions in the electrolyte solution.

However, when the calcium compound is used to suppress the generation of zinc dendrite in the negative electrode, it is necessary that the discharge product $Zn(OH)_4^{2-}$ react with calcium hydroxide and be changed to $CaZn(OH)_4$, which is an insoluble compound. Therefore, the content of calcium hydroxide with respect to zinc should be relatively high. This makes it difficult to sufficiently suppress the generation of zinc dendrite without reducing the battery capacity.

On the other hand, when the alkaline secondary battery of the present invention includes the anion conductive membrane or the polyalkylene glycols, and further the negative electrode contains the calcium compound, this calcium compound is considered to have the effect of suppressing zinc dendrite in cooperation with the anion conductive membrane or the polyalkylene glycols. Therefore, a relatively small amount of the calcium compound may be used. Thus, it is possible to prevent a reduction in the discharge characteristics of the battery due to the use of the calcium compound.

Examples of the calcium compound used in the alkaline secondary battery include compounds such as calcium hydroxide, calcium oxide, calcium chloride, and calcium sulfate that react with $Zn(OH)_4^{2-}$, which is produced during discharge, to form composite compounds including $CaZn(OH)_4$, and the composite compounds themselves. Among them, calcium hydroxide and calcium oxide are preferred.

The content of the calcium compound in the negative electrode is preferably 5 parts by mass or more, more preferably 8 parts by mass or more, and particularly preferably 10 parts by mass or more with respect to 100 parts by mass of the zinc-based particles in order to more favorably improve the charge-discharge cycle characteristics of the battery. The content of the calcium compound in the negative electrode is also preferably 40 parts by mass or less, more preferably 30 parts by mass or less, and particularly preferably 20 parts by mass or less with respect to 100 parts by mass of the zinc-based particles in order to prevent a reduction in the discharge capacity or discharge characteristics of the battery.

A method for incorporating the polyalkylene glycols and the calcium compound in the negative electrode is not particularly limited. For example, a composition may be prepared by directly mixing the polyalkylene glycols or the calcium compound with the zinc-based particles. Alternatively, a composition may be prepared by dissolving or dispersing the polyalkylene glycols or the calcium compound in a solvent such as water and mixing this solution with the zinc-based particles. In the former case, the composition may be used to prepare the negative electrode. In the latter case, the solvent may be evaporated from the composition so that the polyalkylene glycols or the calcium compound adhere to the surface of the zinc-based particles. Then, the zinc-based particles coated with the polyalkylene glycols or the calcium compound may be used to prepare the negative electrode.

The amount of the polyalkylene glycols or the calcium compound covering the surface of the zinc-based particles may be adjusted in such a manner that the content of these compounds in the negative electrode falls in the above range.

The polyalkylene glycols and the calcium compound may be present in the negative electrode after the battery is assembled. In this case, the polyalkylene glycols and the calcium compound may be contained in the constituents other than the negative electrode, such as the alkaline electrolyte solution or the separator, during the assembly of the battery, and a part or the whole of the polyalkylene glycols and the calcium compound may be moved into the negative electrode after the battery is assembled.

For example, if the polyalkylene glycols and the calcium compound are contained in the separator, these compounds in the separator may be dissolved in the electrolyte solution and then moved into the negative electrode after the battery is assembled.

The negative electrode may contain an indium compound in order to more effectively prevent the generation of gas due to a corrosion reaction between the zinc-based particles and the alkaline electrolyte solution.

Examples of the indium compound include indium oxide and indium hydroxide.

The amount of the indium compound in the negative electrode is preferably 0.003 to 1 with respect to 100 of the zinc-based particles at a mass ratio.

The content of the zinc-based particles in the negative electrode is preferably, e.g., 60% by mass or more, and more preferably 65% by mass or more. The content of the zinc-based particles in the negative electrode is also preferably 75% by mass or less, and more preferably 70% by mass or less.

The alkaline electrolyte solution used in the alkaline secondary battery of the present invention is preferably an aqueous solution containing one or more types of alkali metal hydroxides (such as sodium hydroxide, potassium hydroxide, and lithium hydroxide). In particular, potassium hydroxide is preferred. When the alkaline electrolyte solution is, e.g., an aqueous solution of potassium hydroxide, the content of potassium hydroxide is preferably 20% by mass or more, and more preferably 30% by mass or more. The content of potassium hydroxide is also preferably 40% by mass or less, and more preferably 38% by mass or less. The concentration of the aqueous solution of potassium hydroxide is adjusted within this range so that the alkaline electrolyte solution can have excellent conductivity.

In addition to the above components, if necessary, the alkaline electrolyte solution may contain various known additives so as not to impair the effects of the present invention. For example, zinc oxide may be added to the alkaline electrolyte solution to prevent corrosion (oxidation) of the zinc-based particles that are used for the negative electrode of the alkaline secondary battery. In this case, zinc oxide also may be added to the negative electrode.

Moreover, a tin compound or an indium compound may be dissolved in the alkaline electrolyte solution. When these compounds are dissolved in the alkaline electrolyte solution, the charge-discharge cycle characteristics of the battery can be improved even further.

Examples of the tin compound dissolved in the alkaline electrolyte solution include tin chloride, tin acetate, tin sulfide, tin bromide, tin oxide, tin hydroxide, and tin sulfate. Examples of the indium compound dissolved in the alkaline electrolyte solution include indium hydroxide, indium oxide, indium sulfate, indium sulfide, indium nitrate, indium bromide, and indium chloride.

The concentrations of the tin compound and the indium compound in the alkaline electrolyte solution may be expressed in terms of the ratios of tin and indium to the alkaline electrolyte solution, respectively. In such a case, the concentration of each compound is preferably 0.005% by mass (50 ppm) or more, and more preferably 0.05% by mass (500 ppm) or more.

The upper limit of the concentration of each compound (i.e., the ratio of each element) is not particularly limited. However, if the concentration is too high, the compound is likely to be precipitated as an alkali metal salt or the like, and may close the holes of the separator. Therefore, the concentration of each compound is preferably 1% by mass (10000 ppm) or less, and more preferably 0.5% by mass (5000 ppm) or less.

When two or more types of compounds are dissolved in the alkaline electrolyte solution, it is preferable that the total concentration of these compounds falls in the above range.

As described above, the polyalkylene glycols or the calcium compound may be added to the alkaline electrolyte solution as needed, and then incorporated in the negative electrode via the electrolyte solution.

The form of the alkaline secondary battery of the present invention is not particularly limited. The alkaline secondary battery can be in any form such as flat type, laminated type, or tubular type. For example, a flat-type battery (including a coin-type battery and a button-type battery) has a battery case in which an outer can and a sealing plate are joined by caulking via a gasket, or the outer can and the sealing plate are welded to seal the joint between them. A laminated-type battery has an outer package made of a metallic laminated film. A tubular-type battery (including a cylindrical battery and a rectangular (prismatic) battery) has a battery case in which a cylindrical outer can with a bottom and a sealing plate are joined by caulking via a gasket, or the outer can and the sealing plate are welded to seal the joint between them.

When the outer container is sealed by caulking, the gasket arranged between the outer can and the sealing plate may be made of, e.g., PP or nylon. Moreover, when heat resistance is required in relation to the intended use of the battery, the gasket may also be made of heat-resistant resin with a melting point of more than 240° C., including, e.g., a fluorocarbon polymer such as a tetrafluoroethylene-perfluoroalkoxyethylene copolymer (PFA); polyphenylene ether (PPE); polysulfone (PSF); polyarylate (PAR); polyether sulfone (PES); PPS; and PEEK. Further, when the intended use of the battery requires heat resistance, the outer container may be sealed by a glass hermetic seal.

In order to prevent the elution of elements such as iron that constitute the outer can during charge, it is desirable that the inner surface of the outer can be plated with anti-corrosion metal such as gold.

EXAMPLES

Hereinafter, the present invention will be described in detail by way of examples. However, the present invention is not limited to the following examples.

Example 1

A mixed aqueous solution of $AgNO_3$ and $Bi(NO_3)_3$ was prepared, in which the mass ratio of Ag and Bi was adjusted to 100:5. A KOH aqueous solution with a concentration of 50% by mass was prepared and maintained at 95° C. The mixed aqueous solution was gradually added to the KOH aqueous solution and reacted to form a precipitate. Then, the purified precipitate was washed with water and dried, resulting in positive electrode active material particles containing a mixture of $Ag_2O$ and $Ag_5BiO_4$. The positive electrode active material particles had an average particle size of 5 μm. The ratio of the total amount of bismuth to the total amount of silver was 5% by mass.

Using acetylene black and graphite particles as a conductive assistant, 94% by mass of the positive electrode active material, 2% by mass of the acetylene black, and 4% by mass of the graphite particles were mixed to prepare a positive electrode mixture. Then, 110 mg of the positive electrode mixture was filled in a mold and molded under pressure into a disk shape with a packing density of 5.7 $g/cm^3$, a diameter of 9.05 mm, and a height of 0.3 mm. Thus, a positive electrode composed of a positive electrode mixture molded body (positive electrode mixture layer) was produced.

Next, 5 g of a PTFE aqueous dispersion (solid content: 60% by mass), 2.5 g of an aqueous solution of sodium polyacrylate (concentration: 2% by mass), and 2.5 g of hydrotalcite particles (average particle size: 0.4 μm) were kneaded, and then rolled to form a membrane with a thickness of 100 μm. Moreover, the membrane was punched into a circle with a diameter of 9.2 mm, thus providing an anion conductive membrane. The anion conductive membrane was used for the assembly of a battery.

As a negative electrode active material, mercury-free zinc alloy particles containing additional elements of In (500 ppm), Bi (400 ppm), and Al (10 ppm) were used. The mercury-free zinc alloy particles had been generally used in an alkaline battery. The particle size of the zinc alloy particles was determined by the above-described method. Consequently, the average particle size (D50) was 120 μm and the proportion of the particles with a particle diameter of 75 μm or less was 25% by mass or less.

A composition for forming a negative electrode (i.e., a negative electrode composition) was prepared by mixing the zinc alloy particles and ZnO at a ratio (mass ratio) of 97:3. Then, 28 mg of the composition was weighed and used to produce a negative electrode.

An alkaline electrolyte solution was an aqueous solution of potassium hydroxide (concentration: 35% by mass), in which 3% by mass of zinc oxide was dissolved.

A separator was produced by forming two graft films (thickness: 30 μm) on both sides of a cellophane film (thickness: 20 μm), on top of which vinylon-rayon mixed paper (thickness: 100 μm) was further formed. The graft film was composed of a graft copolymer obtained by graft copolymerization of acrylic acid with a polyethylene main chain. This laminated body was punched into a circle with a diameter of 9.2 mm.

Figure 2:
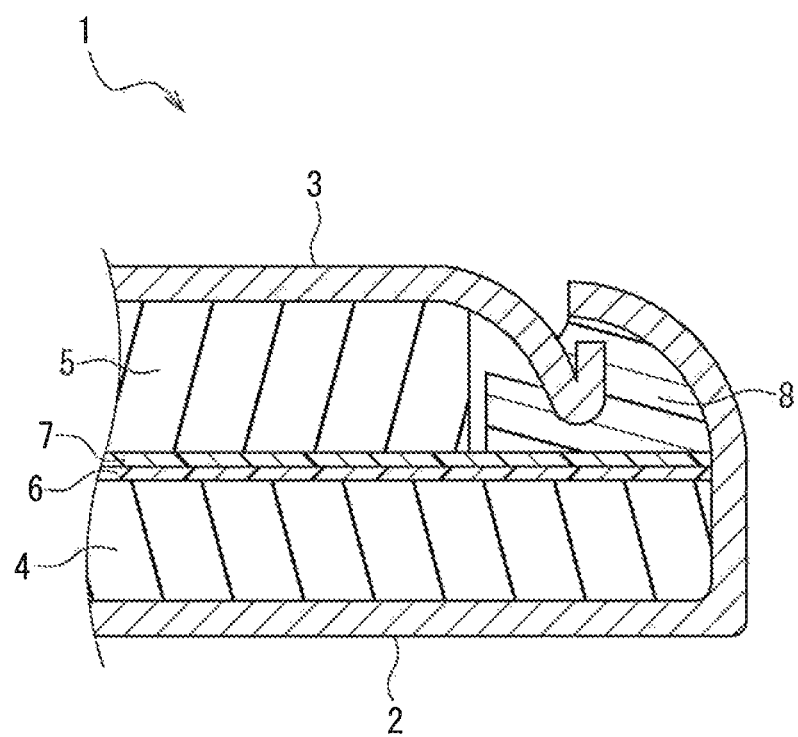
FIG. 2 is a cross-sectional view illustrating the main components of the alkaline secondary battery in FIG. 1.

The positive electrode (positive electrode mixture molded body), the negative electrode (negative electrode composition), the alkaline electrolyte solution, the anion conductive membrane, and the separator were sealed in a battery container. The battery container included an outer can, a sealing plate, and an annular gasket. The outer can was made of a steel plate and had a gold-plated inner surface. The sealing plate was made of a clad plate of copper, stainless steel (SUS304), and nickel. The annular gasket was made of nylon 66. Thus, an alkaline secondary battery with a diameter of 9.5 mm and a thickness of 1.4 mm was produced. FIGS. 1 and 2 show the appearance and structure of the alkaline secondary battery, respectively. The anion conductive membrane was provided to face the negative electrode. The separator was provided on the positive electrode.

In the alkaline secondary battery 1 as shown in FIGS. 1 and 2, the positive electrode 4, the separator 6, and the anion conductive membrane 7 are provided in the outer can 2. The negative electrode 5 is provided in the sealing plate 3. The sealing plate 3 is fitted into the opening of the outer can 2 via the annular gasket (i.e., the resin gasket) 8 having an L-shaped cross section. The opening edge of the outer can 2 is tightened inward, which brings the resin gasket 8 into contact with the sealing plate 3. Thus, the opening of the outer can 2 is sealed to form a closed structure in the battery. In other words, the alkaline secondary battery 1 as shown in FIGS. 1 and 2 is configured such that power generation components, including the positive electrode 4, the negative electrode 5, the separator 6, and the anion conductive membrane 7, are placed in the space (closed space) of the battery container, which includes the outer can 2, the sealing plate 3, and the resin gasket 8. Moreover, an alkaline electrolyte solution (not shown) is injected into the space and held by the separator 6. The outer can 2 also serves as a positive electrode terminal, and the sealing plate 3 also serves as a negative electrode terminal.

Example 2

A positive electrode mixture was prepared by mixing 95.6% by mass of the positive electrode active material, 0.6% by mass of the acetylene black, and 3.8% by mass of the graphite particles. Then, 80 mg of the positive electrode mixture was filled in a mold and molded under pressure into a disk shape with a packing density of 5.7 g/cm$^3$, a diameter of 5.17 mm, and a height of 0.6 mm. Thus, a positive electrode composed of a positive electrode mixture molded body (positive electrode mixture layer) was produced in the same manner as Example 1.

An anion conductive membrane and a separator were formed to have a diameter of 5.7 mm. A negative electrode composition with a mass of 19 mg was prepared. A battery was assembled in the same manner as Example 1 by using the positive electrode, the anion conductive membrane, the separator, and the negative electrode composition. Thus, an alkaline secondary battery with a diameter of 5.8 mm and a thickness of 2.7 mm was produced.

Comparative Example 1

An alkaline secondary battery was produced in the same manner as Example 1 except that $Ag_2O$ particles with an average particle size of 5 μm and the positive electrode active material particles obtained in Example 1 were mixed so that the ratio of the total amount of bismuth to the total amount of silver was 1% by mass, and this mixture was used to produce a positive electrode.

Comparative Example 2

Using a mixed aqueous solution of $AgNO_3$ and $Bi(NO_3)_3$, in which the mass ratio of Ag and Bi was adjusted to 100:10, positive electrode active material particles were prepared in the same manner as Example 1 so that the ratio of the total amount of bismuth to the total amount of silver was 10% by mass. An alkaline secondary battery was produced in the same manner as Example 1 except that the positive electrode active material particles were used to produce a positive electrode.

The batteries of Example 1, Example 2, Comparative Example 1, and Comparative Example 2 were subjected to a constant-current and constant-voltage charge and a constant current discharge. Specifically, the individual batteries were charged with a constant current of 4 mA until the battery voltage reached 1.85 V and then charged with a constant voltage of 1.85 V (in this case, the charge was terminated when the current value was reduced to 0.4 mA). Subsequently, the charged batteries were discharged with a constant current of 2 mA (discharge cutoff voltage: 1.0 V). This charge-discharge cycle was repeated 10 times. Based on the time required for the battery voltage to reach 1.85 V from the start of the charge in the 10th charge cycle, a current value C (mA) for a constant current charge in the 11th cycle was estimated for each battery. Then, the batteries underwent the following charge-discharge cycle: a constant current charge at the above current value C (mA) until the battery voltage reached 1.85 V a constant voltage charge at 1.85 V (in this case, the charge was terminated when the current value was reduced to C/10 (mA)), and a constant current discharge at C/2 (mA) (discharge cutoff voltage: 1.0V).

The results confirmed that the charging time of each of the batteries for the constant current charge in the 11th cycle was 4±0.25 hours. Using the discharge curves of the individual batteries, the position of a step of the discharge curve (i.e., the depth of discharge x corresponding to the inflection point), the value of $V_{10}-V_{70}$ representing the flatness of the discharge curve, and the value of $V_{70}-V_{90}$ representing the size of the step of the discharge curve were determined.

FIGS. 3 to 6 show the discharge curves of the batteries. Table 1 shows the results obtained from the discharge curves. In each of the batteries of Comparative Examples 1 and 2, the value of $V_{70}-V_{90}$ does not represent the size of the step of the discharge curve, since the discharge curve does not have a step in the range where the depth of discharge is 70% to 90%.

TABLE 1

| | Position of step of discharge curve x (%) | Flatness of discharge curve $V_{10} - V_{70}$ (V) | Size of step of discharge curve $V_{70} - V_{90}$ (V) |
|---|---|---|---|
| Example 1 | 80 | 0.030 | 0.079 |
| Example 2 | 76 | 0.046 | 0.078 |
| Comparative Example 1 | 93 | 0.019 | 0.030 |
| Comparative Example 2 | 62 | 0.115 | 0.022 |

Figure 3:
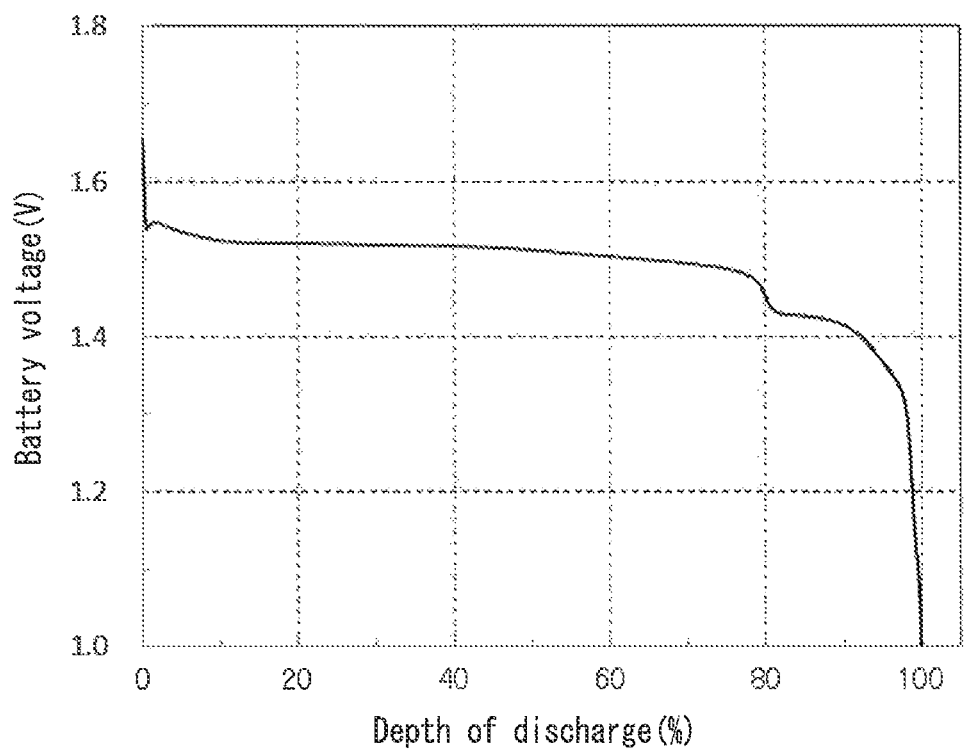
FIG. 3 is a discharge curve of an alkaline secondary battery in Example 1.
Figure 4:
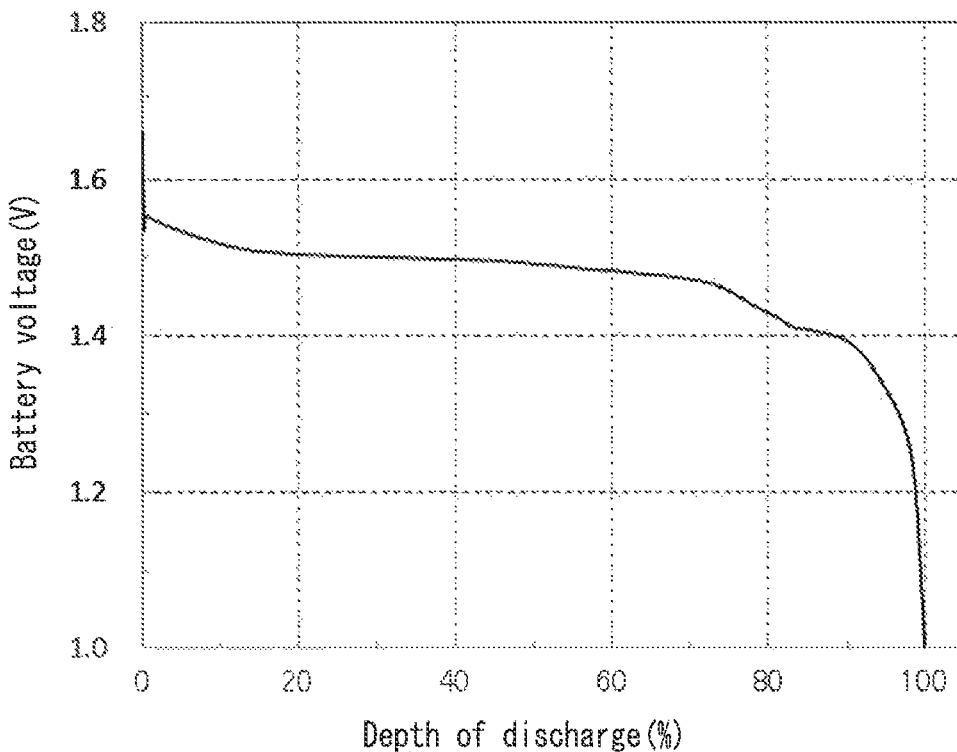
FIG. 4 is a discharge curve of an alkaline secondary battery in Example 2.
Figure 5:
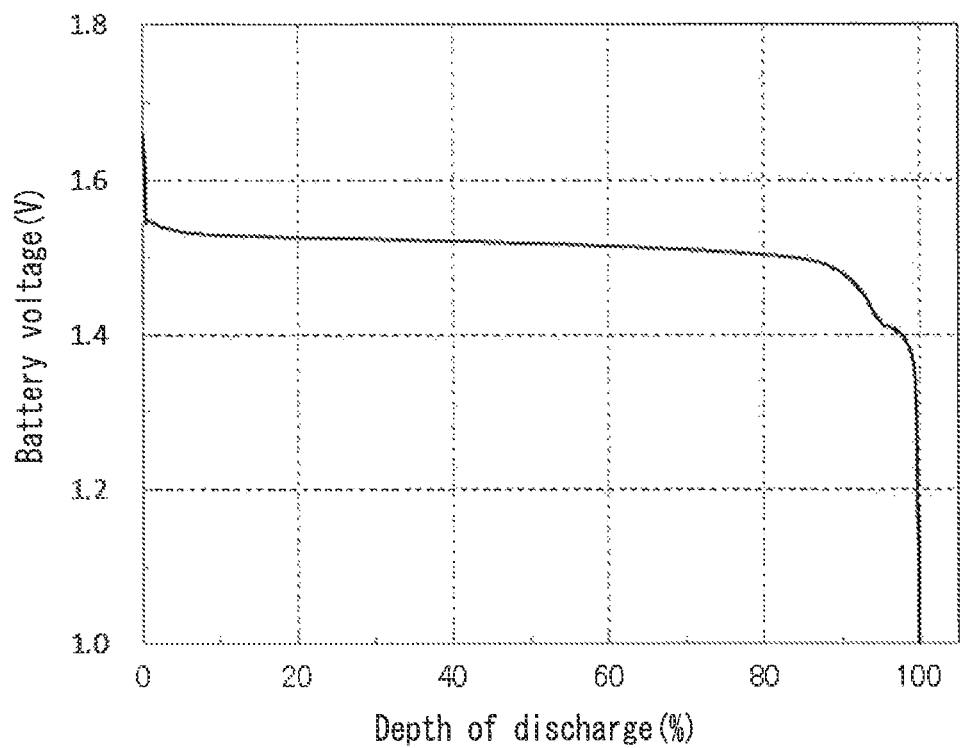
FIG. 5 is a discharge curve of an alkaline secondary battery in Comparative Example 1.
Figure 6:
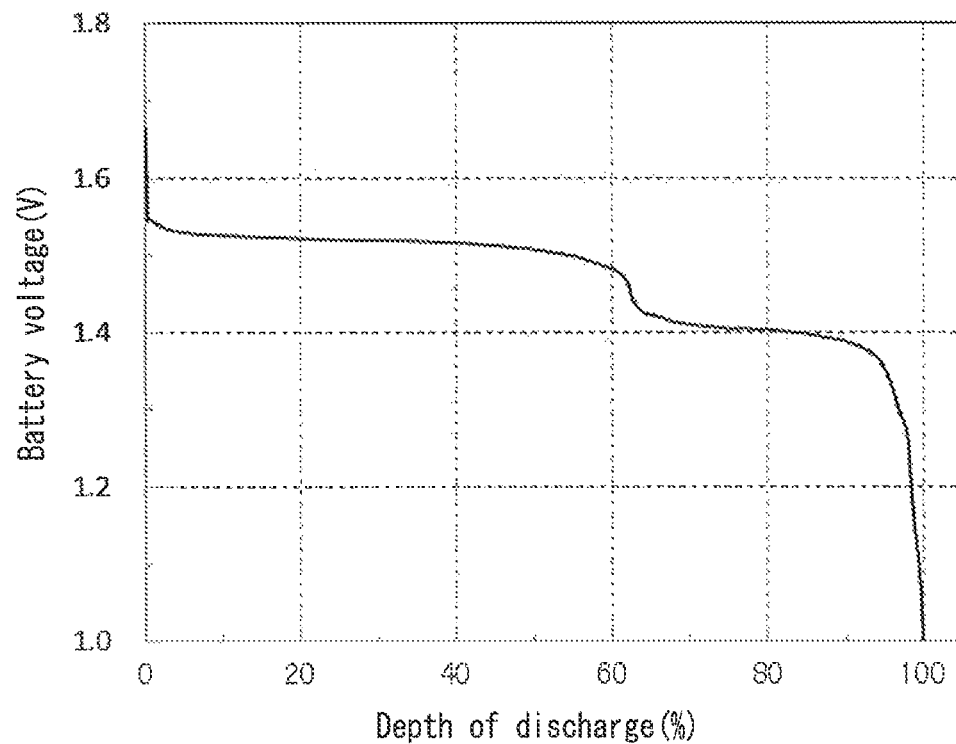
FIG. 6 is a discharge curve of an alkaline secondary battery in Comparative Example 2.

As is evident from the shapes of the discharge curves in FIGS. 3 and 4, the alkaline secondary batteries of Examples 1 and 2 of the present invention are excellent in the flatness of the respective discharge curves. Moreover, both the discharge curves have a step of a certain size or larger in the range where the depth of discharge is 70% to 90%. Therefore, the end-of-discharge time of each of the batteries can easily be detected in advance.

On the other hand, the discharge curve of the alkaline secondary battery of Comparative Example 1 has a shape similar to that of a discharge curve of a battery in which only a silver oxide ($Ag_2O$) is used as a positive electrode active material. The step of the discharge curve occurs immediately before completion of the discharge. There is not enough time between the detection of the end-of-discharge time and the actual completion of the discharge. Thus, it is difficult to detect in advance the end-of-discharge time and to take measures such as charging the battery.

The discharge curve of the alkaline secondary battery of Comparative Example 2 is inferior in its flatness because the step of the discharge curve occurs at the position where the depth of discharge is smaller than 70%. Moreover, it takes too long from the detection of the end-of-discharge time to the actual completion of the discharge, which may pose a problem in the utility of the battery.

DESCRIPTION OF REFERENCE NUMERALS

1 Alkaline secondary battery
2 Outer can
3 Sealing plate
4 Positive electrode (positive electrode mixture molded body)
5 Negative electrode
6 Separator
7 Anion conductive membrane
8 Gasket

The invention claimed is:

1. An alkaline secondary battery comprising:
a positive electrode containing a positive electrode active material;
a negative electrode; and
a separator,
wherein the positive electrode active material contains a mixture of a silver oxide and a silver-bismuth complex oxide, and
wherein a discharge curve is obtained when the battery that is fully charged is discharged with a constant current until a battery voltage drops to 1.0 V,
the battery voltage at a point on the discharge curve where x (%) of a total discharge capacity has been discharged from the battery since start of discharge is represented by $V_x$ (V), and
the discharge curve satisfies $V_{10}-V_{70} \leq 0.08$, has a step in a range of $70 \leq x \leq 90$, and shows that a size of the step represented by $V_{70}-V_{90}$ is 0.04 or more and 0.15 or less.

2. The alkaline secondary battery according to claim 1, wherein the total discharge capacity is a discharge capacity of the battery obtained under the following charge and discharge conditions:
for charging, the battery is subjected to a constant-current and constant-voltage charge, which is a combination of a constant current charge where the battery that has been discharged to 1.0 V is charged with a current value C (mA) at which it takes 4±0.25 hours for the battery voltage to reach 1.85 V from start of charge, and a constant voltage charge where the battery is charged with a voltage of 1.85 V, and the charge of the battery is terminated when the current value is reduced to C/10 (mA);
for discharging, the battery is subjected to a constant current discharge where the battery is discharged with a current of C/2 (mA), and the discharge of the battery is terminated when the battery voltage is reduced to 1.0 V.

3. The alkaline secondary battery according to claim 1, wherein there is an inflection point in the range of 70<x<90 of the discharge curve on which x (%) as a depth of discharge is represented by a horizontal axis and the battery voltage $V_x$ (V) is represented by a vertical axis.

4. The alkaline secondary battery according to claim 1, wherein a ratio of a total amount of bismuth to a total amount of silver contained in the mixture is more than 2% by mass and less than 9% by mass.

5. The alkaline secondary battery according to claim 1, wherein an average valence of bismuth of the silver-bismuth complex oxide is 3.

6. The alkaline secondary battery according to claim 1, wherein the silver-bismuth complex oxide is a complex oxide expressed by $(Ag_2O)_{1-t}(Bi_2O_3)t$.

* * * * *